US011560157B2

(12) United States Patent
Ide et al.

(10) Patent No.: US 11,560,157 B2
(45) Date of Patent: Jan. 24, 2023

(54) REMOTELY OPERATED AUTOMATIC DRIVING VEHICLE WITH IN-VEHICLE EMERGENCY STOP FEATURE

(71) Applicant: TOYOTA JIDOSHA KABUSHIKI KAISHA, Toyota (JP)

(72) Inventors: Hirohito Ide, Nagoya (JP); Yuchi Yamanouchi, Toyota (JP); Masaki Shitara, Nagakute (JP); Ryo Hattori, Kariya (JP); Satoshi Koganemaru, Toyota (JP); Takeshi Uraki, Yokkaichi (JP); Shogo Nakata, Kariya (JP); Yasunori Imada, Yokkaichi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 59 days.

(21) Appl. No.: 16/907,975

(22) Filed: Jun. 22, 2020

(65) Prior Publication Data
US 2020/0406931 A1     Dec. 31, 2020

(30) Foreign Application Priority Data

Jun. 28, 2019    (JP) .............................. JP2019-121666

(51) Int. Cl.
*B60W 60/00*     (2020.01)
*B60W 10/20*     (2006.01)
(Continued)

(52) U.S. Cl.
CPC ........ *B60W 60/0025* (2020.02); *B60W 10/04* (2013.01); *B60W 10/20* (2013.01);
(Continued)

(58) Field of Classification Search
None
See application file for complete search history.

(56) References Cited

U.S. PATENT DOCUMENTS

2002/0007235 A1*   1/2002   Hwang .................... B60L 3/04
                                                                      701/23
2010/0117585 A1*   5/2010   Fitch ....................... B25J 19/06
                                                                      318/568.12
(Continued)

FOREIGN PATENT DOCUMENTS

JP     2011-255757 A     12/2011
JP     2014-019390 A     2/2014
(Continued)

OTHER PUBLICATIONS

Heller et al. (Machine Translation of WO 2017/0364070 A1), Method for Triggering an Emergency Stop of a Vehicle, Foreign Priority to DE 102019204797.1 filed Apr. 4, 2019, obtained from WIPO Patentscope, all. (Year: 2019).*

*Primary Examiner* — James J Lee
*Assistant Examiner* — Tawri M Matsushige
(74) *Attorney, Agent, or Firm* — Oliff PLC

(57) ABSTRACT

A driving control device receives power supply from an accessory battery to operate, controls automatic driving, and outputs a control signal. A steering ECU, a power ECU and a brake ECU instruct a steering mechanism, a PCU and a brake to operate based on the control signal, respectively. An emergency stop switch is operated by an operator. In a case where the emergency stop switch is operated, an interface processing device cuts off a switch to stop the power supply, shuts down the driving control device, and outputs a control signal that causes the steering mechanism, the PCU and the brake to perform an emergency stop operation.

5 Claims, 15 Drawing Sheets

(51) Int. Cl.
  *B60Q 1/46*   (2006.01)
  *B60W 10/04*  (2006.01)
  *B60W 50/14*  (2020.01)
  *B60W 10/18*    (2012.01)
(52) U.S. Cl.
  CPC .......... *B60W 50/14* (2013.01); *B60W 60/007* (2020.02); *B60W 60/0053* (2020.02); *B60Q 1/46* (2013.01); *B60W 10/18* (2013.01); *B60W 2050/146* (2013.01)

(56) References Cited

U.S. PATENT DOCUMENTS

| | | | | |
|---|---|---|---|---|
| 2015/0338849 | A1* | 11/2015 | Nemec | B60W 30/06 701/25 |
| 2015/0346724 | A1* | 12/2015 | Jones | B60W 50/087 701/23 |
| 2017/0364070 | A1* | 12/2017 | Oba | B60W 50/082 |
| 2018/0188726 | A1* | 7/2018 | Newman | B60W 50/00 |
| 2019/0070957 | A1* | 3/2019 | Nakatsuka | B60W 30/12 |
| 2019/0137999 | A1 | 5/2019 | Taguchi et al. | |
| 2020/0198599 | A1* | 6/2020 | Schulz-Weiling | B60T 7/12 |
| 2020/0249693 | A1* | 8/2020 | Hamilton | H04W 4/44 |
| 2020/0379472 | A1* | 12/2020 | Nakatsuka | G05D 1/0221 |
| 2021/0325871 | A1 | 10/2021 | Taguchi et al. | |
| 2022/0135056 | A1* | 5/2022 | Masuda | B60W 30/181 701/23 |

FOREIGN PATENT DOCUMENTS

| | | |
|---|---|---|
| JP | 2017-19434 A | 1/2017 |
| JP | 2018-124855 A | 8/2018 |
| JP | 2019-040277 A | 3/2019 |
| JP | 2019-087015 A | 6/2019 |
| WO | WO-2020200845 A1 * | 10/2020 |

* cited by examiner

REMOTELY OPERATED AUTOMATIC DRIVING VEHICLE WITH IN-VEHICLE EMERGENCY STOP FEATURE

CROSS REFERENCE TO RELATED APPLICATION

This application claims priority to Japanese Patent Application No. 2019-121666 filed on Jun. 28, 2019, which is incorporated herein by reference in its entirety including the specification, claims, drawings, and abstract.

TECHNICAL FIELD

The present disclosure relates to an automatic driving vehicle comprising an emergency stop switch.

BACKGROUND

An automatic driving vehicle capable of automatically driving is known. Automatic driving means that a computer executes at least part of driving control including vehicle speed control, steering control or the like. The automatic driving vehicle generally comprises a plurality of driving modes including an automatic driving mode to perform the automatic driving, and a manual driving mode in which an operator on board in the automatic driving vehicle performs driving control. Furthermore, there is also an automatic driving vehicle that accepts an operation input from the operator to perform control even in the automatic driving mode.

It is described in JP 2018-124855A that in a case where an emergency stop switch is pressed, an automatic driving vehicle selects an emergency stop position at which the vehicle can stop safely, and performs control to stop the vehicle.

SUMMARY

It is considered that an automatic driving vehicle comprises an emergency stop switch, and is capable of accepting an operation input from an operator in an automatic driving mode. It is assumed that an operator operates the emergency stop switch, and then immediately, for example, changes a vehicle speed. In this case, it is necessary to consider what type of control is to be performed.

In JP 2018-124855A, however, it is not described how to control the vehicle in a case where the emergency stop switch is pressed.

Furthermore, for example, a situation is conceivable where during travel in the automatic driving mode, unauthorized access is made via communication equipment, and a driving operation falls into a bad condition. In this case, it is necessary to consider what control mode is to be adopted in pressing the emergency stop switch and stopping the vehicle safely.

It is an advantage of the present disclosure to provide vehicle stop control with enhanced safety in a case where an emergency stop switch is operated during travel in an automatic driving mode.

An automatic driving vehicle according to the present disclosure comprises a driving control device that receives power supply from a battery to operate, controls automatic driving concerning at least a vehicle speed and a steering angle, and outputs a control signal, a driving mechanism instruction device that inputs the control signal, and instructs a driving mechanism to perform a driving operation based on the control signal, an emergency stop switch to be operated by an operator, and an emergency stop control device that, in a case where the emergency stop switch is operated, cuts off the power supply to shut down the driving control device, and outputs a control signal that causes the driving mechanism instruction device to perform an emergency stop operation.

In an aspect of the automatic driving vehicle according to the present disclosure, in a case where the emergency stop switch is operated, an activated state of a device that is not associated with the automatic driving control is maintained.

In another aspect of the automatic driving vehicle according to the present disclosure, the automatic driving vehicle comprises, in addition to the driving control device, a manual driving control device that accepts an operation of manual driving by the operator, to control the manual driving, and the emergency stop control device also shuts down the manual driving control device in a case where the emergency stop switch is operated.

In still another aspect of the automatic driving vehicle according to the present disclosure, the device that is not associated with the automatic driving control includes a user interface control device that accepts an operation from the operator to control in-vehicle equipment.

According to the present disclosure, in a case where an emergency stop switch is pressed, it is possible to perform emergency stop without being disrupted by control based on automatic driving.

BRIEF DESCRIPTION OF DRAWINGS

Embodiment(s) of the present disclosure will be described based on the following figures, wherein.

DESCRIPTION OF EMBODIMENTS

Hereinafter, description will be given of embodiments with reference to the drawings. In the description, to facilitate understanding, specific aspects are shown, but these aspects merely illustrate embodiments, and various other embodiments can be realized.

Figure 1:
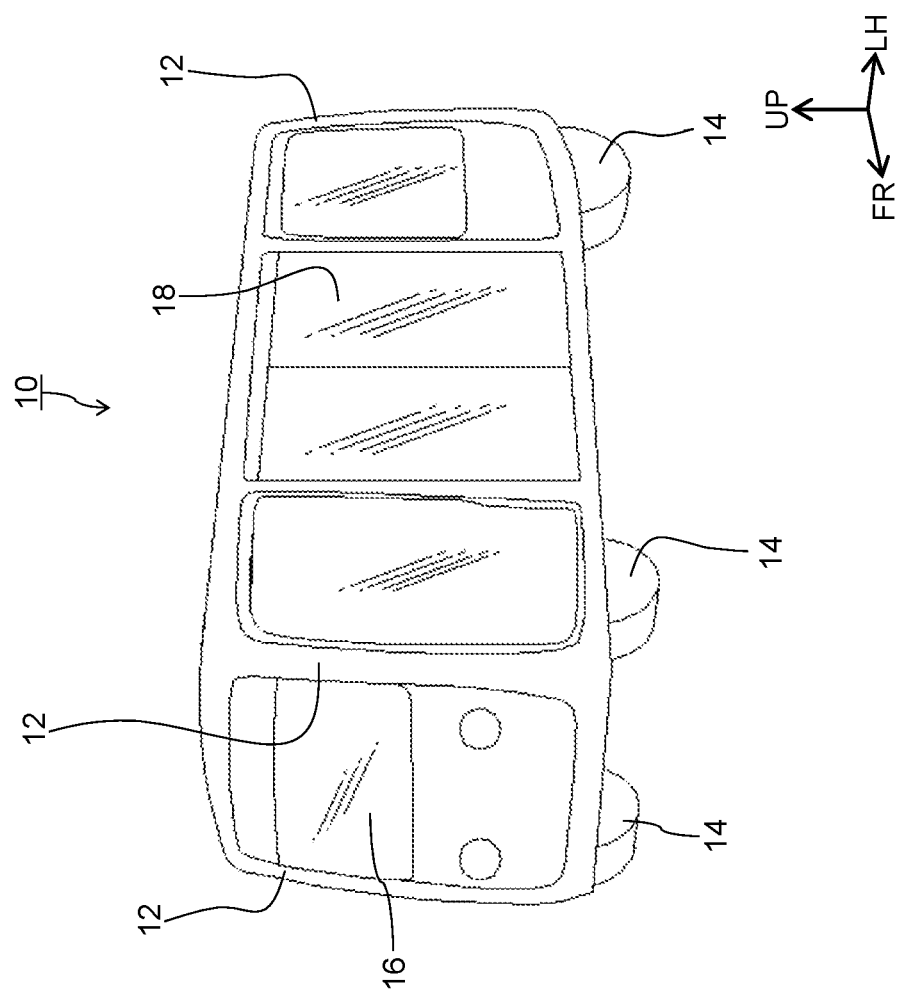
FIG. 1 is an external view of an automatic driving vehicle according to an embodiment of the present disclosure.

FIG. 1 is an external view of an automatic driving vehicle 10 according to the present embodiment. In respective drawings of the present description, terms of front (FR) and rear indicate front and rear in a vehicle front-back direction, terms of left (LH) and right indicate left and right when looking forward, and up (UP) and down indicate up and down in a vehicle up-down direction.

The automatic driving vehicle 10 has an almost rectangular parallelepiped shape that is symmetrical in a front-back direction, and also has an appearance that is symmetrical in the front-back direction. At four corners in planar view, pillars 12 extending in an up-down direction are provided, and under each of the pillars 12, a wheel 14 is provided. Most of the front, rear, right and left side walls of the automatic driving vehicle 10 are translucent panels 16. Each of the panels 16 may be a display panel, on which characters or the like may be displayed.

A part of the panels on the left side is a slidable door 18, and the door 18 is slid to open for an occupant to gets in and out of the vehicle. Note that although not shown in FIG. 1, a ramp that can be taken inside and outside is stored in a lower part of the door 18. The ramp is for use when a wheelchair it taken in and out of the vehicle.

Furthermore, the automatic driving vehicle 10 is an automatically drivable vehicle. Specifically, the automatic driving vehicle 10 can drive in a plurality of driving modes including an automatic driving mode and a manual driving mode. In the present embodiment, as the automatic driving mode, there are provided a control mode by a management center, and a control mode by the automatic driving vehicle 10.

The automatic driving mode is a driving mode in which driving control is performed mainly by a computer. In the present description, the driving control is a concept including shift change control, vehicle speed control, or steering control. The vehicle speed control is a concept including start control, stop control, and acceleration/deceleration control of the automatic driving vehicle 10. The steering control is control for maintaining and changing of a steering angle.

In the automatic driving mode, the control mode by the management center is a mode in which the driving control is performed by the computer mounted in the automatic driving vehicle 10 under the driving control from the management center. The management center is provided to manage and control a plurality of automatic driving vehicles 10, and a network is constructed to be capable of communicating with each of the automatic driving vehicles 10. In the control mode by the management center, a travel route of the automatic driving vehicle 10 is determined by the control of the management center. Furthermore, the driving control by the computer mounted in the automatic driving vehicle 10 is mostly executed under control of the management center. However, in the present embodiment, the start control from a stopped state is performed upon receiving an input of an operation by the operator on board in the automatic driving vehicle 10.

In the automatic driving mode, the control mode by the automatic driving vehicle 10 is a driving mode in which any control from outside is not received in principle, and most of the driving control of the automatic driving vehicle 10 is performed only by determination of the computer mounted in the automatic driving vehicle 10. According to the present embodiment, in the control mode by the automatic driving vehicle 10, no control from the management center is received, and the computer of the automatic driving vehicle 10 performs the driving control based on detection results of various sensors (e.g., a camera, LIDAR, etc.) provided in the automatic driving vehicle 10, so that the vehicle travels along a predetermined route. However, the start control from the stopped state is performed upon receiving the input of the operation by the operator on board in the automatic driving vehicle 10.

The manual driving mode is a mode in which the automatic driving vehicle 10 does not perform any automatic driving, and the operator on board in the automatic driving vehicle 10 performs the driving control of the automatic driving vehicle 10.

Note that the operator is a person on board in the automatic driving vehicle 10, and is engaged in the control of the automatic driving vehicle 10. In the automatic driving mode, the management center or the automatic driving vehicle 10 itself mainly controls the driving, and the operator has less opportunities to control the driving. However, the operator is involved in the start control from the stopped state, and additionally has authority to perform, for example, deceleration control, and can be therefore considered to be engaged in the control of the automatic driving vehicle 10. In the manual driving mode, the operator performs a role of a driver who directly performs a driving operation of the automatic driving vehicle 10, and can be therefore considered to be engaged in the control of the automatic driving vehicle 10.

The automatic driving vehicle 10 is a shared vehicle in which an unspecified large number of occupants are on board together. In the present embodiment, the automatic driving vehicle 10 is utilized as a bus that transports passengers in a specific site while traveling along a prescribed route. Consequently, it is assumed that the automatic driving vehicle 10 repeats stop and start with comparatively high frequency. Furthermore, the automatic driving vehicle 10 is assumed to travel at a comparatively low speed (e.g., 30 km/h or less).

Note that a usage form of the automatic driving vehicle 10 disclosed herein can be suitably changed, and the automatic driving vehicle 10 may be utilized, for example, as a movable business space, a retail store that displays and sells various commodities, or a store such as a restaurant that cooks and serves food and drink. Furthermore, as another form, the automatic driving vehicle 10 may be used as an office for clerical work, meetings with clients and the like. Additionally, a usage setting of the automatic driving vehicle 10 is not limited to a business situation, and the automatic driving vehicle 10 may be used, for example, as personal transportation. In addition, both a travel pattern and a vehicle speed of the automatic driving vehicle 10 may be suitably changed.

The automatic driving vehicle 10 is an electric car including, as a motor, a drive motor that receives power supply from a battery. The battery is a chargeable and dischargeable secondary battery, and is regularly charged by external power. Note that the automatic driving vehicle 10 is not limited to the electric car, and may be another type of car. For example, the automatic driving vehicle 10 may be an engine car including an engine mounted as the motor therein, or a hybrid car including the engine and the drive motor mounted as the motors therein. Furthermore, the automatic driving vehicle 10 may be a hydrogen car that drives the drive motor with power generated by a fuel cell.

Figure 2:
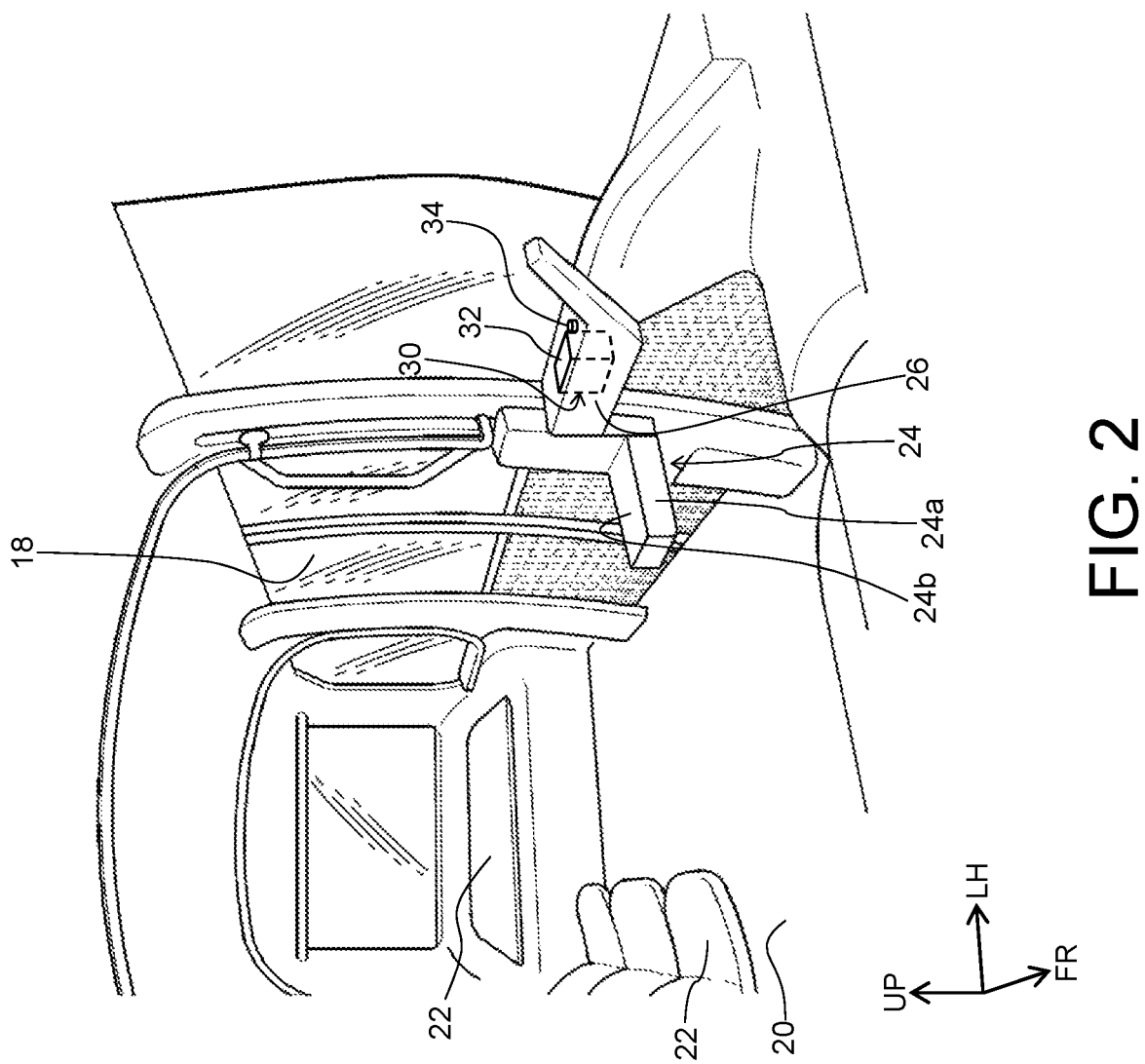
FIG. 2 is a first perspective view showing a vehicle interior of the automatic driving vehicle according to the present embodiment.
Figure 3:
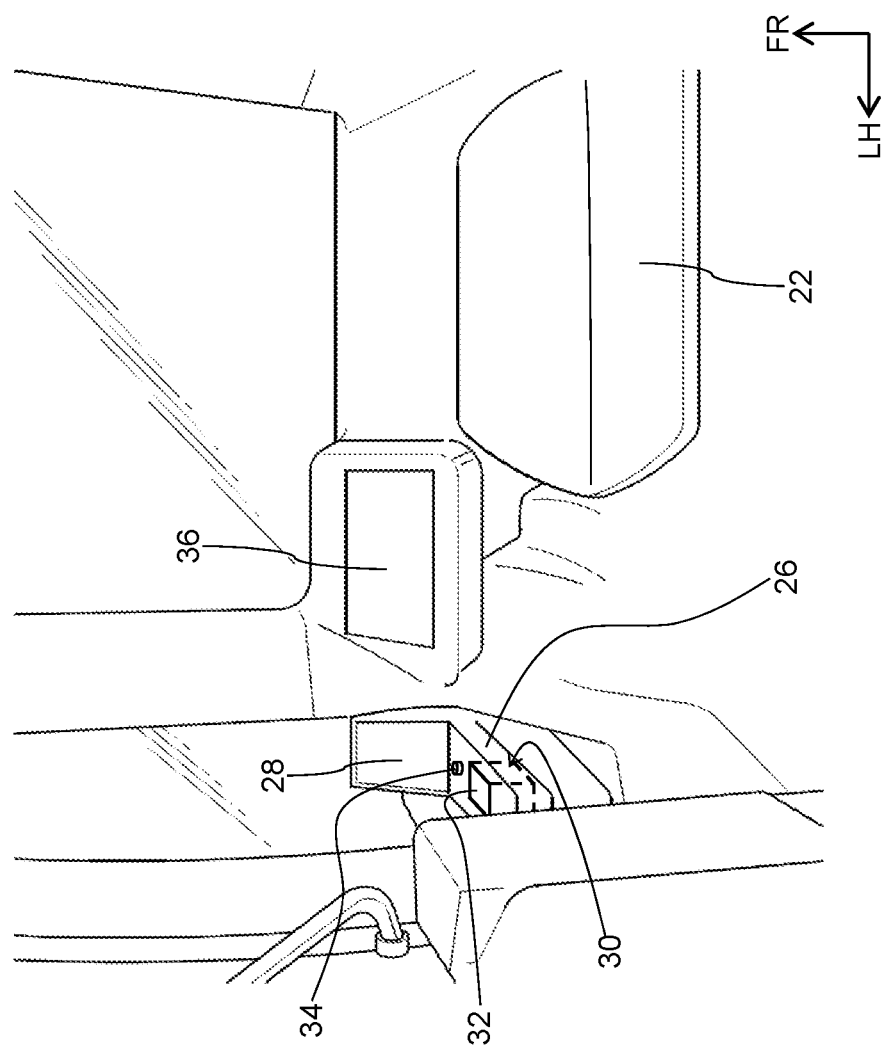
FIG. 3 is a second perspective view showing the vehicle interior of the automatic driving vehicle according to the present embodiment.

FIG. 2 and FIG. 3 are perspective views showing a vehicle interior of the automatic driving vehicle 10. As described above, the automatic driving vehicle 10 is utilized as a bus, and hence a central part of the vehicle interior serves as a floor 20 for an occupant standing on board in the vehicle or a wheel chair where an occupant is seated. Furthermore, seats 22 for occupants are provided along the side walls of the vehicle interior.

In the automatic driving vehicle 10, an operator seat 24 is provided for the operator who performs the driving control of the automatic driving vehicle 10, and operates each piece of equipment (an air conditioner, a wiper or the like) provided in the automatic driving vehicle 10. FIG. 2 shows that a seat part 24a of the operator seat 24 is lowered to expose a seat surface 24b, and the seat part 24a can be flipped up. In the present embodiment, the operator seat 24 is provided near a front side of the door 18 on a left side of the vehicle interior, but the operator seat 24 may be provided on a right side of the vehicle interior.

On a front side of the operator seat 24, an armrest 26 extending in the front-back direction is provided so that the operator seated on the operator seat 24 places their arm on the armrest. As described above, in the present embodiment, since the operator seat 24 is provided on the left side of the vehicle interior, the armrest 26 is disposed in a left side end of the vehicle interior. If the operator seat 24 is provided on the right side of the vehicle interior, the armrest 26 is disposed in a right-side end of the vehicle interior. The armrest 26 is provided above the seat surface 24b of the operator seat 24 when the seat is in a state where it can be sat on.

On a front end of the armrest 26, provided is a touch panel 28 standing upward from a top of the armrest 26 (see FIG. 3). The touch panel 28 faces rearward (i.e., on an operator seat 24 side). This allows the operator to manually operate the touch panel 28 while seated on the operator seat 24 and placing their arm on the armrest 26. The touch panel 28 is a user interface, and enables an operation other than the driving operation, in addition to operation input concerning the driving in the automatic driving mode (a vehicle speed control operation or the like). An example of the operation other than the driving operation is a control operation to in-vehicle equipment (a turn lamp, a horn, a headlight, the air conditioner, the wiper or the like) provided in the automatic driving vehicle 10. Description will be given later on details of a display screen of the touch panel 28.

Furthermore, in the armrest 26, there is provided a storage unit 30 that is capable of storing a mechanical operation unit to perform a driving control operation to the automatic driving vehicle 10. The storage unit 30 is covered with a lid 32, that is, the mechanical operation unit stored in the storage unit 30 is not exposed to the vehicle interior. In the present embodiment, the top of the armrest 26 is flush with the lid 32. Note that in the present embodiment, the storage unit 30 is provided in the armrest 26, but the storage unit 30 may be provided in a place other than the armrest 26. Also, in this case, the storage unit 30 may be provided in an inconspicuous place, for example, at an end of one of the front, rear, right and left sides of the vehicle interior. Description will be given later on details of the storage unit 30, the lid 32 and the mechanical operation unit.

Furthermore, a mechanical emergency stop switch 34 to input an (emergency) stop instruction to the automatic driving vehicle 10 is provided on the top of the armrest 26. In the present embodiment, the emergency stop switch 34 is a button.

The automatic driving vehicle 10 is provided with only three operation devices to control the vehicle speed of the automatic driving vehicle 10, that is, the touch panel 28, the mechanical operation unit, and the emergency stop switch 34. That is, the automatic driving vehicle 10 is not provided with foot pedals to be operated by feet for controlling the vehicle speed, such as an accelerator pedal or a brake pedal provided in a conventional car or the like.

Note that in a front left corner of the vehicle interior, a display 36 is provided to display information on the automatic driving vehicle 10 (see FIG. 3). For example, the display 36 displays information such as the vehicle speed of the automatic driving vehicle 10, an outside temperature, and a location to be stopped at next. Similarly to the touch panel 28, the display 36 also faces rearward. Consequently, when seen from the operator seated on the operator seat, the touch panel 28 and the display 36 are arranged side by side. Therefore, the operator can visually recognize both the touch panel 28 and the display 36. The display 36 can be provided at the same height as that of the touch panel 28. Specifically, the display 36 can be provided so that an upper end of the display 36 and an upper end of the touch panel 28 have the same height, a lower end of the display 36 and a lower end of the touch panel 28 have the same height, or a center of the display 36 in a height direction and a center of the touch panel 28 in the height direction have the same height. Furthermore, although not shown in the drawing, a display is provided in another place of the vehicle interior, to provide the passengers with information. Furthermore, in the vehicle, a speaker (not shown) is also provided, to provide the passengers with the information by voice.

Figure 4:
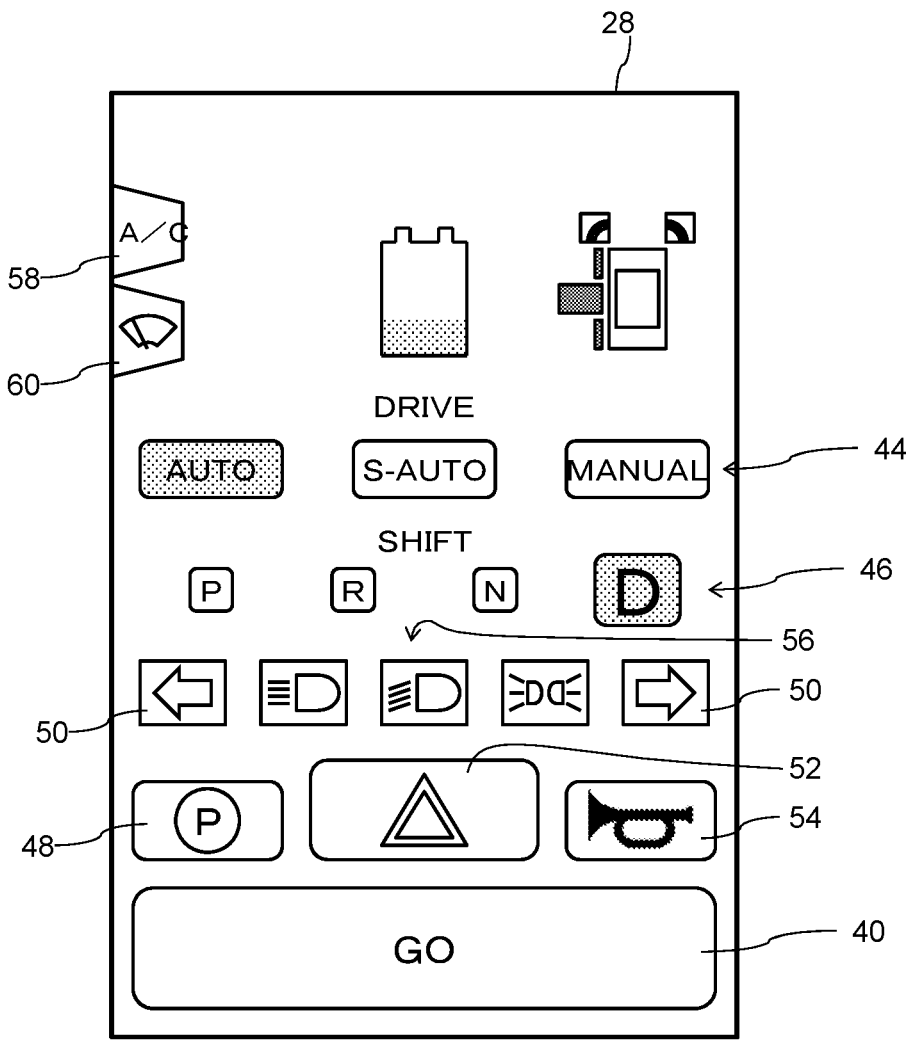
FIG. 4 is a view showing a screen of a touch panel during stop.
Figure 4:
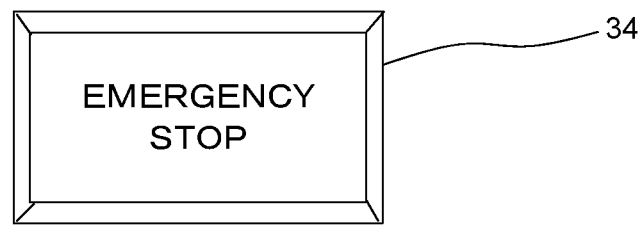
Figure 5:
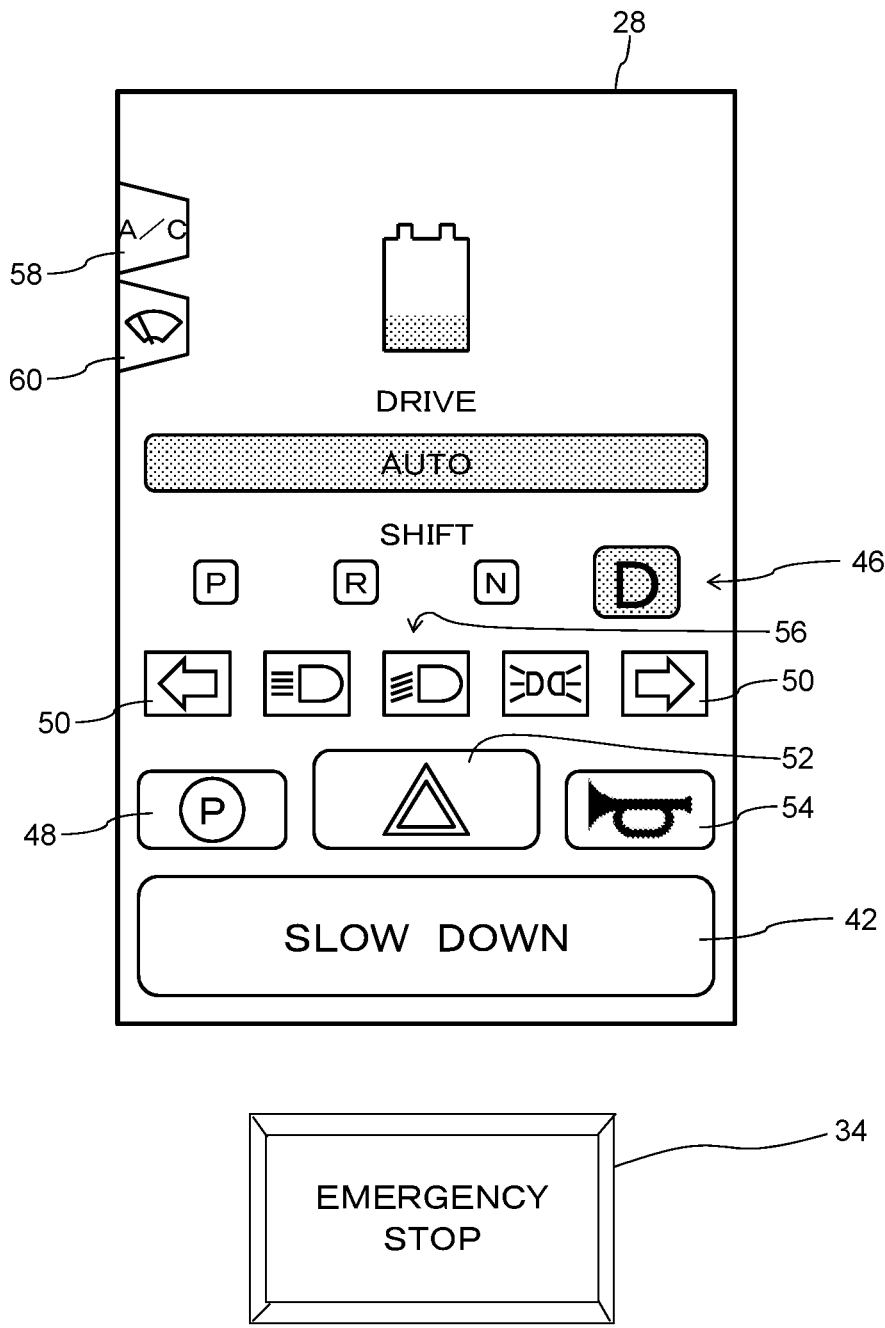
FIG. 5 is a view showing a screen of the touch panel during automatic travel.

FIG. 4 and FIG. 5 show a screen to be displayed in the touch panel 28, and the emergency stop switch 34 provided below the touch panel 28. The touch panel 28 in FIG. 4 shows the display screen when the automatic driving vehicle 10 in the automatic driving mode is stopped. Furthermore, the touch panel 28 in FIG. 5 shows the display screen when the automatic driving vehicle 10 in the automatic driving mode is traveling.

First, description will be given of the display of the touch panel 28 when the automatic driving vehicle 10 in the automatic driving mode is stopped, with reference to FIG. 4. In the touch panel 28, a GO button 40 is displayed as a vehicle speed control button to input a vehicle speed control instruction to the automatic driving vehicle 10. The GO button 40 is a button to input a start instruction to the automatic driving vehicle 10, and when the GO button 40 is operated, the automatic driving vehicle 10 starts travel (in the automatic driving mode in this case).

Next, description will be given of the display of the touch panel 28 when the automatic driving vehicle 10 in the automatic driving mode is traveling, with reference to FIG. 5. In the touch panel 28, a SLOW DOWN button 42 as the vehicle speed control button is displayed in place of the GO button 40. The SLOW DOWN button 42 is a button to input a deceleration control instruction to the automatic driving vehicle 10, and when the SLOW DOWN button 42 is operated, the automatic driving vehicle 10 decelerates. Repeated operations of the SLOW DOWN button 42 can stop the automatic driving vehicle 10.

In the present embodiment, the operator can only input the deceleration control instruction as the vehicle speed control during the travel in the automatic driving mode, but in addition to the SLOW DOWN button 42, a button to input an acceleration control instruction or a button to input a stop instruction may be displayed, to enable the input of the acceleration control instruction or the stop instruction. Needless to say, in the automatic driving mode, the automatic driving vehicle 10 can automatically decelerate or stop in response to an instruction from the management center. When the automatic driving vehicle 10 stops, again as shown in FIG. 4, the GO button 40 is displayed in place of the SLOW DOWN button 42.

The touch panel 28 displays, in addition to the vehicle speed control button, a driving mode button 44 to input a driving mode change instruction, a shift button 46 to input a shift change control instruction, a parking brake button 48 to input an operation/release instruction of an electric parking brake, and various equipment control buttons to input equipment control instructions to the equipment provided in the automatic driving vehicle 10. In the examples of FIG. 4 and FIG. 5, the touch panel displays, as the equipment control buttons, a turn lamp button 50 to control the turn lamp, a hazard button 52 to operate hazard warning lights, a horn button 54 to operate the horn, a light button 56 to control a headlight/taillight, an air conditioner tab 58 to control the air conditioner, and a wiper tab 60 to control the wiper. When the air conditioner tab 58 is touched, various buttons to control the air conditioner are displayed, and when the wiper tab 60 is touched, various buttons to control the wiper are displayed. Note that the driving mode button 44 can be operated only while the automatic driving vehicle 10 is stopped. Furthermore, according to the present embodiment, in the automatic driving mode, the operator's operation cannot achieve shift change, and hence the shift button 46 cannot be operated.

Furthermore, the touch panel 28 displays, for example, a battery remaining amount of the automatic driving vehicle 10, an opening/closing state of the door 18, a slope state, and sensing states of various sensors provided in the automatic driving vehicle 10.

The emergency stop switch 34 is installed below the touch panel 28. The emergency stop switch 34 is a physically provided button, unlike various buttons provided in the touch panel 28. The emergency stop switch 34 is provided near the touch panel 28, and hence in a case where the operator feels the need for emergency stop, the operator immediately performs an operation of pressing the emergency stop switch 34, so that the automatic driving vehicle 10 can be stopped in an emergency. Specific processing for the emergency stop will be described later.

Figure 6:
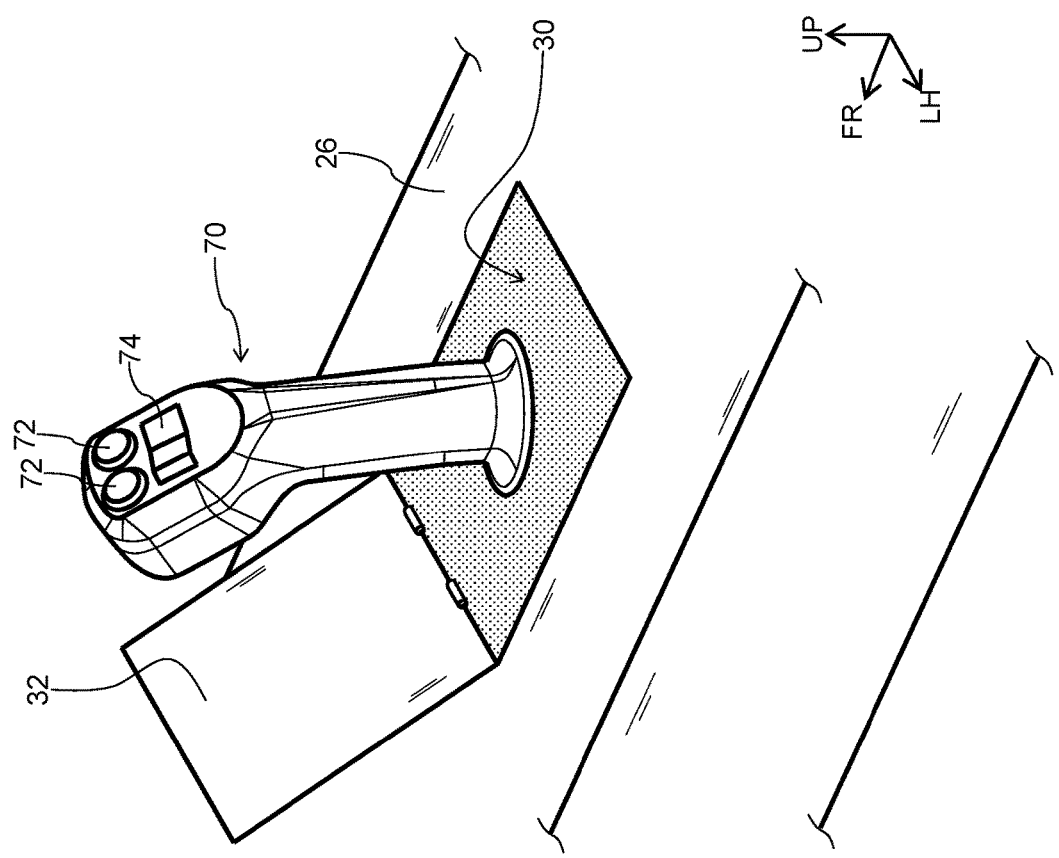
FIG. 6 is a perspective view of a mechanical operation unit.

FIG. 6 shows a mechanical operation unit 70 pulled out of the storage unit 30. The mechanical operation unit 70 has a stick form stored in the storage unit 30 extending in the up-down direction. The mechanical operation unit 70 stored in the storage unit 30 reduces a likelihood of an operator's erroneous operation of the mechanical operation unit 70 or a likelihood of another occupant's operation of the mechanical operation unit 70. The lid 32 may be locked so that the occupant other than the operator cannot open the lid 32. Furthermore, the mechanical operation unit 70 is stored in the storage unit 30, so that a vehicle interior space can be effectively utilized.

When the operator opens the lid 32 to pull the mechanical operation unit 70 upward and outward, the mechanical operation unit 70 can have an operable state as shown in FIG. 6. Alternatively, a switch may be provided in the storage unit 30, and the switch may be operated so that the mechanical operation unit 70 automatically moves upward from the storage unit 30. In the operable state, the mechanical operation unit 70 can stand from the top surface of the armrest 26. As described above, since the armrest 26 is provided above the seat surface 24b of the operator seat 24 in a state where the seat 24 can be sat on, the mechanical operation unit 70 is also provided above the seat surface 24b in the seat-able state.

The mechanical operation unit 70 is pulled out of the storage unit 30 mainly in a case where the driving mode of the automatic driving vehicle 10 is the manual driving mode. In a case where the driving mode of the automatic driving vehicle 10 is the automatic driving mode, the mechanical operation unit 70 may be stored in the storage unit 30 to prevent erroneous operation of the mechanical operation unit 70.

The mechanical operation unit 70 can be operated like a lever. That is, the mechanical operation unit 70 has a lower end as a fulcrum and can be tilted in front-back and right-left directions. When tilting the mechanical operation unit 70 forward, the acceleration control instruction is input to the automatic driving vehicle 10, and when tilting the mechanical operation unit 70 rearward, the deceleration control instruction is input to the automatic driving vehicle 10. Furthermore, when tilting the mechanical operation unit 70 leftward, a left turn control instruction is input to the automatic driving vehicle 10, and when tilting the mechanical operation unit 70 rightward, a right turn control instruction is input to the automatic driving vehicle 10.

Additionally, in an upper part of the mechanical operation unit 70, a mechanical equipment control switch is provided to input an equipment control instruction to the equipment provided in the automatic driving vehicle 10. In the present embodiment, as the equipment control switch, a switch is provided to issue an alarm to the outside of the vehicle. Specifically, there are provided a turn lamp switch 72 to operate the turn lamp, and a horn switch 74 to operate the horn. Thus, the mechanical operation unit 70 can not only input the acceleration/deceleration control instructions and the turn control instructions, but also operate the turn lamp and the horn. Needless to say, as the equipment control switch, another equipment controlling switch may be provided in the mechanical operation unit 70.

According to the present embodiment, the touch panel 28 is disposed in the front end of the armrest 26, and the mechanical operation unit 70 is positioned above the armrest 26. That is, the touch panel 28 is disposed close to the mechanical operation unit 70. In the present embodiment, also in a case of performing the driving control by use of the mechanical operation unit 70, for example, the equipment provided in the automatic driving vehicle 10 or the like is operated using the touch panel 28. Thus, the touch panel 28 is provided close to the mechanical operation unit 70, and hence the operator can operate both the touch panel 28 and the mechanical operation unit 70.

Figure 7:
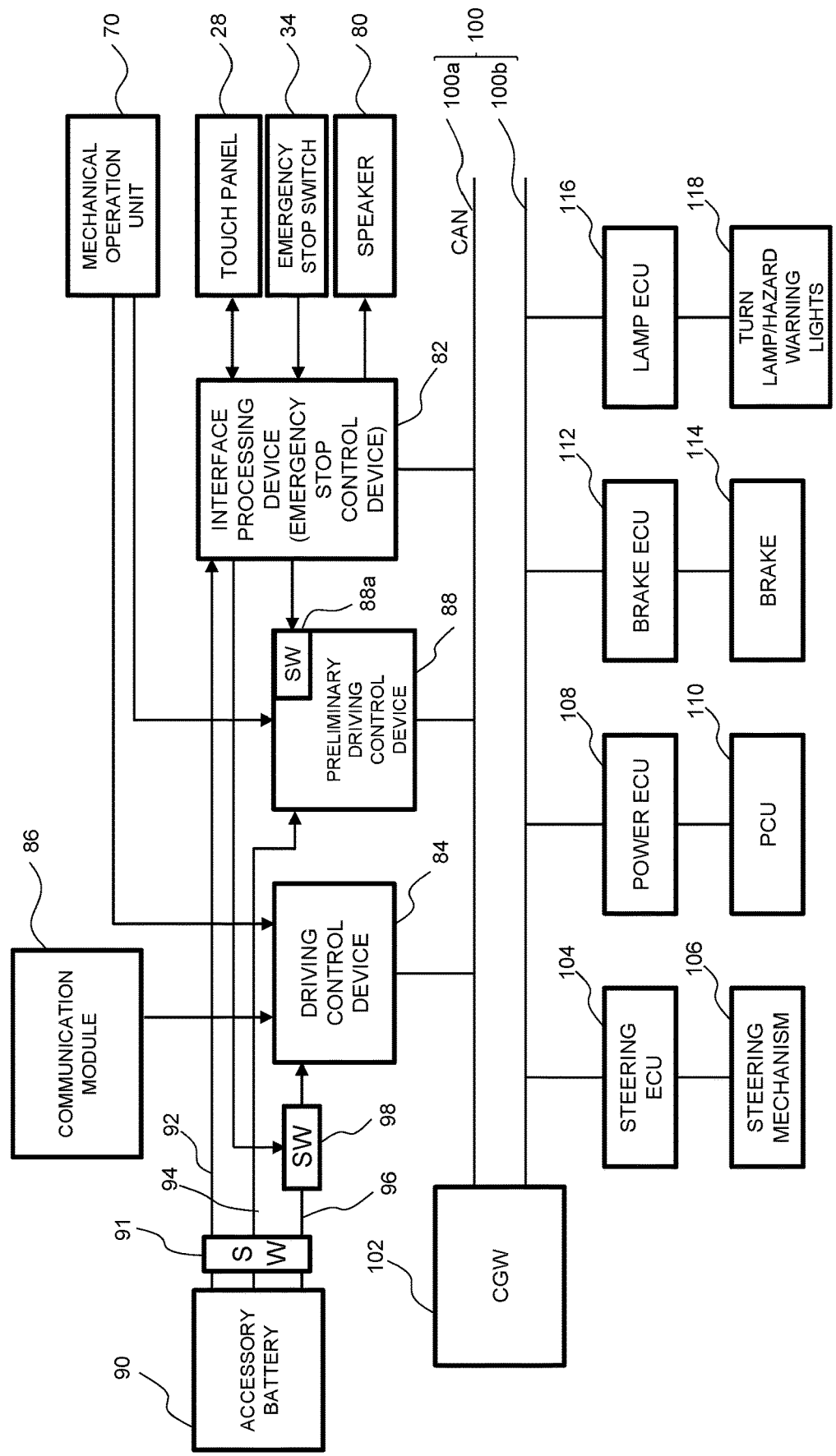
FIG. 7 is a functional block diagram of a driving control device according to the present embodiment.

Subsequently, description will be given of a control mechanism of the automatic driving vehicle 10 with reference to FIG. 7. FIG. 7 is a simple functional block diagram showing a configuration associated with the driving control in the automatic driving vehicle 10.

FIG. 7 shows, at the upper right, the mechanical operation unit 70, the touch panel 28 and the emergency stop switch 34 described above. Furthermore, a speaker 80 is a device provided in the vehicle interior to transmit voice to the operator or the passenger.

An interface processing device 82 is one of user interface control devices connected to user interfaces of the touch panel 28, the emergency stop switch 34, the speaker 80 and the like, to perform control associated with these user interfaces. The interface processing device 82 controls and operates computer hardware of a processor or the like with software. The interface processing device 82 is also connected to a bus 100a that constitutes a controller area network (CAN) 100 being a network provided in the automatic driving vehicle 10. The interface processing device 82 performs processing of transmitting an operation signal input from the touch panel 28 to the bus 100a and sending a signal received from the bus 100a to the touch panel 28 or the like.

The interface processing device 82 also performs control concerning an emergency stop operation when inputting an operation signal from the emergency stop switch 34. That is, the interface processing device 82 includes a function of an emergency stop control device. Examples of emergency stop control include shutdown of a driving control device 84 or a preliminary driving control device 88, output of emergency voice/display to the speaker 80 or the like, and output of a control signal that causes a steering ECU 104 or the like to perform the emergency stop operation. The emergency stop control will be described later.

The driving control device 84 is a device that serves as both an automatic driving control device that performs the driving control in the automatic driving mode and a manual driving control device that performs the driving control in the manual driving mode. The driving control device 84 controls and operates the computer hardware of the processor or the like with the software, and can be mounted, for example, as an electric control unit (ECU). The driving control device 84 is connected to the bus 100a of the CAN 100, and inputs the operation signal from the touch panel 28 via the interface processing device 82. The operation signal for the driving mode selected by the operator is input from the touch panel 28. The driving control device 84 performs the control in the automatic driving mode (the control mode by the management center, or the control mode by the automatic driving vehicle 10) or the manual driving mode in accordance with the selected driving mode.

The driving control device 84 is connected to a communication module 86, and can input the control from the management center or the like. According to the control mode by the management center in the automatic driving mode, the driving control is performed based on the control from the management center. Furthermore, the driving control device 84 is also connected to various sensors (not shown) for the camera, LIDAR and the like, and inputs detection data using the sensors. In the automatic driving mode, detection results of the sensors are processed to perform the automatic driving. In the automatic driving mode, for example, operation signals of the GO button 40 and the SLOW DOWN button 42 are input from the touch panel 28, and also input to the driving control device 84.

The driving control device 84 is connected to the mechanical operation unit 70 without being connected to the CAN 100. In the manual driving mode, the driving control device 84 inputs an operation signal from the mechanical operation unit 70 to perform the driving control.

The driving control device 84 outputs control signals to the steering ECU 104, a power ECU 108, a brake ECU 112, a lamp ECU 116 and the like through the CAN 100. Consequently, the driving control device 84 performs a specific driving operation.

The communication module 86 is a device that communicates with the outside via an antenna or the like. The communication module is constructed by controlling the hardware comprising a communication processing circuit and the like with software. The communication module 86 receives a control signal concerning the driving from the management center, and outputs the signal to the driving control device 84. Note that although not shown in the drawing, the communication module 86 is also connected to another configuration of the automatic driving vehicle 10 to perform various communications between the automatic driving vehicle 10 and the outside of the vehicle.

The preliminary driving control device 88 is a preliminarily provided device, and is for use in place of the driving control device 84, for example, in a case where the driving control device 84 does not operate. The preliminary driving control device 88 controls and operates the computer hardware of the processor or the like with the software, and is mounted, for example, as an ECU. However, the preliminary driving control device 88 is a manual driving control device that does not include the driving control function in the automatic driving mode and only performs the driving control in the manual driving mode. Consequently, the preliminary driving control device 88 is not connected to the communication module 86.

The preliminary driving control device 88 is connected to the mechanical operation unit 70, and inputs an operation signal concerning the manual driving. Furthermore, the preliminary driving control device 88 is connected to the bus 100a of the CAN 100, and outputs control signals to the steering ECU 104, the power ECU 108, the brake ECU 112, the lamp ECU 116 and others via the CAN 100. The preliminary driving control device 88 contains a switch (SW) 88a. The switch 88a shuts down the preliminary driving control device 88 in a case of receiving a stop signal from the interface processing device 82.

An accessory battery 90 is a battery that supplies power to various accessories in the automatic driving vehicle 10. In the automatic driving vehicle 10, the accessory battery 90 is provided separately from a main battery that supplies power to the drive motor. FIG. 7 shows only three devices, i.e., the interface processing device 82, the preliminary driving control device 88 and the driving control device 84, as power supply targets of the accessory battery 90. The power is supplied to the interface processing device 82 through a feed line 92, the power is supplied to the preliminary driving control device 88 through a feed line 94, and the power is supplied to the driving control device 84 through a feed line 96.

A switch (SW) 91 is provided upstream of the feed lines 92, 94 and 96. The switch 91 is a basic switch to be operated prior to activation of the automatic driving vehicle 10, and is formed using, for example, a relay, and installed as an outside switch provided on an outer wall of the automatic driving vehicle 10. The outside switch is a switch to be turned on by the operator before boarding and to be turned off after boarding. In a case of turning on the switch 91, the power starts to be supplied from the accessory battery 90 to the interface processing device 82, the preliminary driving control device 88, and the driving control device 84, and in a case of turning off the switch, the power supply is stopped. Then, the operator boards the vehicle in a state where the outside switch is on, and turns on an activation switch (not shown) so that the automatic driving vehicle 10 is ready to travel.

The switch 91 turns on, and then the accessory battery 90 always supplies power to the interface processing device 82 through the feed line 92. That is, in a case where the switch 91 is on, the interface processing device 82 is always activated. The interface processing device 82 is a user interface control device that controls the user interface, and is set to maintain an activated state so that various types of in-vehicle equipment can be controlled even if the emergency stop switch 34 is operated.

The switch 91 turns on, and then the accessory battery 90 also always supplies power to the preliminary driving control device 88 through the feed line 94. Therefore, in a case where the switch 91 is on, in principle, the preliminary driving control device 88 is activated. However, the interface processing device 82 sends a stop signal to the switch 88a provided in the preliminary driving control device 88, so that the preliminary driving control device 88 can shut down. There are not any special restrictions on a type of switch 88a, and the switch can be prepared using, for example, a semiconductor. In a case where the emergency stop switch 34 is operated, the interface processing device 82 sends the stop signal to the switch 88a, to shut down the preliminary driving control device 88. Here, the shut-down indicates a state where no driving control operations at all are performed by the preliminary driving control device 88.

The switch 91 turns on, and then, in principle, the driving control device 84 receives power from the accessory battery 90 through the feed line 96. Therefore, in a case where the switch 91 is on, in principle, the driving control device 84 is activated. Note that the interface processing device 82 sends a stop signal to a switch (SW) 98 provided in the feed line 96, so that the supply of the power through the feed line 96 can stop and the driving control device 84 can shut down. There are not any special restrictions on a structure of the switch 98, and the switch is formed using, for example, a relay. When the emergency stop switch 34 operates, the interface processing device 82 sends the stop signal to the switch 98 to cut the feed line 96, thereby shutting down the driving control device 84.

The CAN 100 is an in-vehicle network comprising the bus 100a and a bus 100b. In the CAN 100, communication is performed in accordance with a predetermined protocol. The buses 100a and 100b are connected to a central gateway (CGW) 102. The CGW 102 is a device that controls communication between the bus 100a and the bus 100b in the CAN 100.

The bus 100b is connected to the steering ECU 104, the power ECU 108, the brake ECU 112 and the lamp ECU 116. Each of these units is constructed by controlling the hardware comprising the processor with the software.

The steering ECU 104 is a driving mechanism instruction device that manages and instructs a steering mechanism 106, being a driving mechanism. The steering mechanism 106 is a mechanical device that maintains and changes a steering angle (i.e., an orientation of the wheel 14), to control a proceeding direction of the automatic driving vehicle 10. The steering ECU 104 transmits a steering instruction signal to the steering mechanism 106 to control steering.

The power ECU 108 is a driving mechanism instruction device that manages and instructs a power control unit (PCU) 110, being a driving mechanism. The PCU 110 constitutes, together with the drive motor, a system that accelerates and decelerates the automatic driving vehicle 10. The PCU 110 is a device comprising a power semiconductor that controls the power supply to the drive motor or power regeneration from the drive motor. The power ECU 108 transmits a signal that instructs the PCU 110 to operate as the power semiconductor, thereby controlling rotation of the drive motor, and acceleration and deceleration of the automatic driving vehicle 10.

The brake ECU 112 is a driving mechanism instruction device that manages and instructs a brake 114, being a driving mechanism. The brake 114 is a mechanical device that applies a frictional force to stop rotation of the wheel 14. The brake ECU 112 instructs the brake 114 on a size of the frictional force to be applied by the brake 114, and the automatic driving vehicle 10 is thereby controlled to decelerate or stop.

The lamp ECU 116 is an instruction device that manages and instructs turn lamp/hazard warning lights 118. The turn lamp/hazard warning lights 118 are driving assistance devices comprising the turn lamp indicating the proceeding direction of the vehicle, and the hazard warning lights that notify that the vehicle is in a hazard situation. Note that the turn lamp and the hazard warning lights are usually configured using the same lamp, and distinguished by varying a lighting mode. The lamp ECU 116 controls lighting on/off of the turn lamp/hazard warning lights 118.

Figure 8:
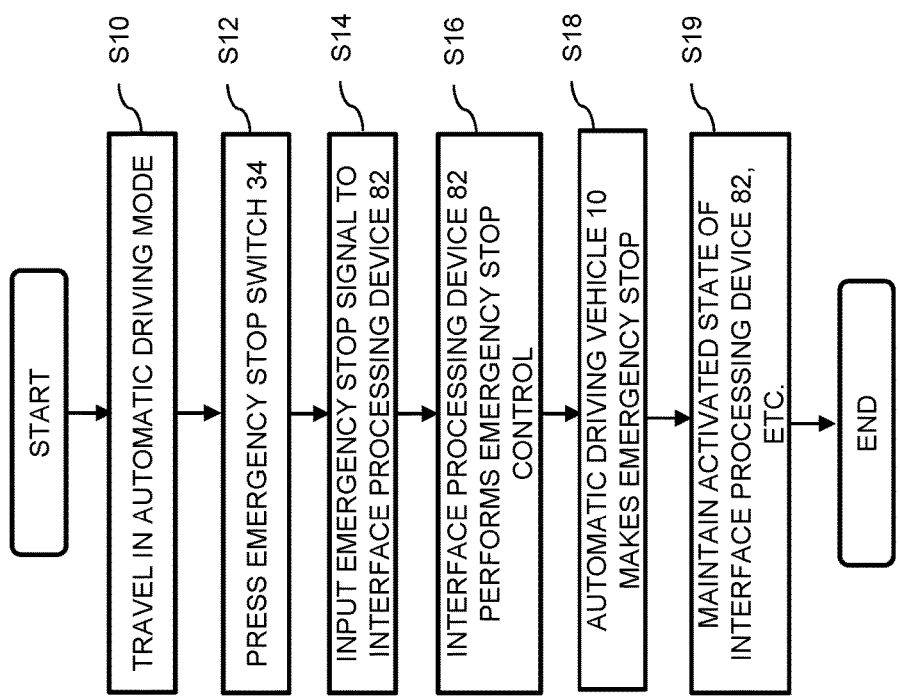
FIG. 8 is a flowchart showing flow of processing during an emergency stop switch operation.

Next, flow for emergency stop will be described with reference to FIG. 8 to FIG. 15. FIG. 8 is a flowchart showing overall flow till the emergency stop, and FIG. 9 to FIG. 15 are flowcharts showing individual flows of processing to be performed in an emergency stop process.

In the flowchart of FIG. 8, there is first assumed a situation where the driving is performed in the automatic driving mode and the automatic driving vehicle 10 travels (S10). In this stage, the driving control device 84 sends the control signals to the steering ECU 104, the power ECU 108, the brake ECU 112 and the lamp ECU 116, to perform the driving control of the automatic driving vehicle.

Here, it is assumed that the operator presses the emergency stop switch 34 (S12). The operator presses the emergency stop switch 34, for example, in a case of visually recognizing an object that obstructs proceeding of the automatic driving vehicle 10, or in a case of feeling a defect in the driving of the automatic driving vehicle 10.

When pressed, the emergency stop switch 34 converts this press operation to an electrical signal and outputs the signal. The interface processing device 82 inputs this electrical signal as an emergency stop signal (S14). In this case, the interface processing device 82 performs the emergency stop control in a programmed step order (S16). Next, description will be given of a specific mode of the emergency stop control with reference to FIG. 8 to FIG. 15. The emergency stop control is performed so that the automatic driving vehicle 10 makes emergency stop (S18). Note that in a case where the automatic driving vehicle 10 makes the emergency stop, the activated state of the interface processing device 82 is maintained, and in principle, the device in a mode other than the automatic driving mode is also maintained in the activated state (S19). For example, the activation of the interface processing device 82 is maintained, and accordingly the touch panel 28, that is the user interface, is used for input of functions other than a function concerning the driving control. This also enables, for example, control of in-vehicle equipment such as the turn lamp, the headlight, the air conditioner, or the wiper to be controlled through the touch panel 28. Furthermore, the communication module 86 is also configured to accept instructions related to functions other than driving control from the management center. Consequently, for example, safety check, contact with the management center or the like can be performed promptly. After the vehicle is stopped in an emergency, whether to enable the manual driving depends on an emergency stop control mode to the preliminary driving control device 88 as will be described later.

Figure 9:
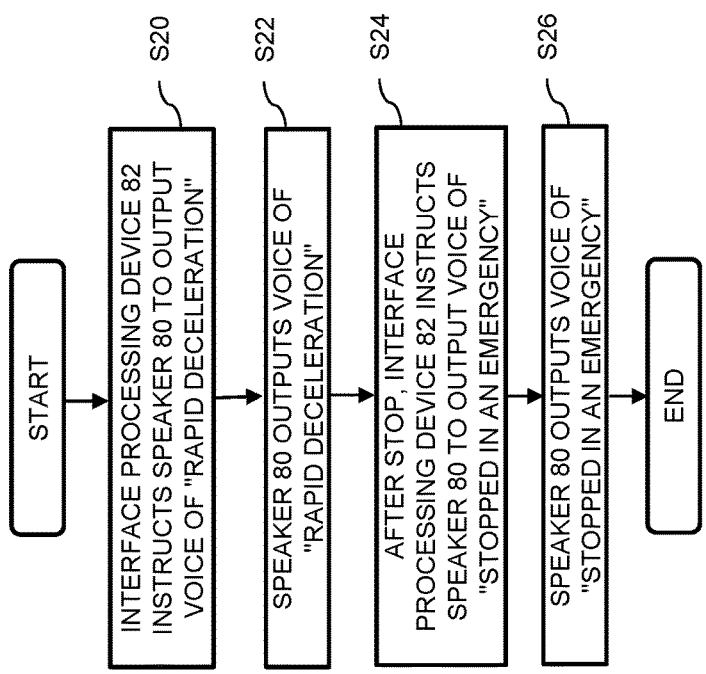
FIG. 9 is a flowchart showing processing flow for a speaker.

FIG. 9 shows flow of processing relating to the speaker 80 to be performed in the emergency stop control by the interface processing device 82 shown in the step S16 of FIG. 8. The interface processing device 82 outputs, to the speaker 80, voice data indicating "urgent deceleration" stored in advance in a case where the emergency stop signal is input (S20). The speaker 80 inputs this voice data to output voice of "rapid deceleration", and notifies the passengers of the rapid deceleration (S22).

Furthermore, after the automatic driving vehicle 10 stops, the interface processing device 82 outputs, to the speaker 80, voice data of "stopped in an emergency" stored in advance (S24). In a case where the voice data is input, the speaker 80 outputs voice of "stopped in an emergency", and notifies the passengers of being stopped in an emergency (S26). The speaker 80 repeatedly outputs the voice of "stopped in an emergency" via an appropriate interval. The interface processing device 82 similarly performs both display of "rapid deceleration" and display of "stopped in an emergency" to the display 36.

Figure 10:
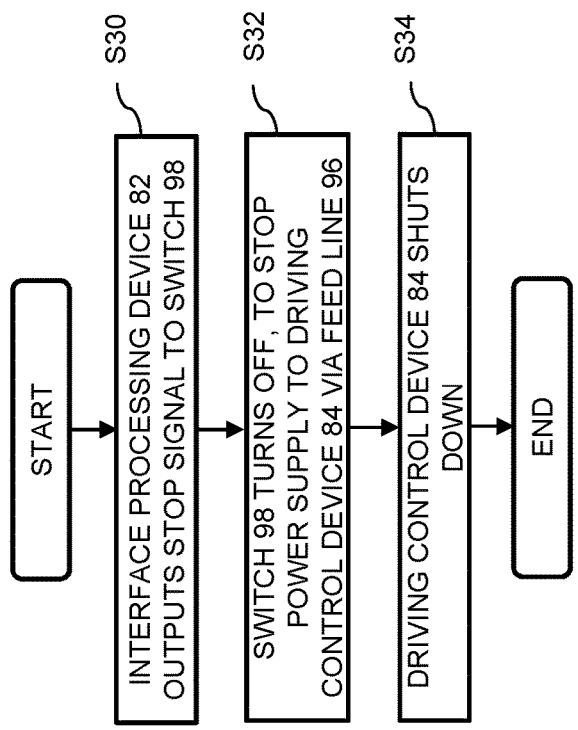
FIG. 10 is a flowchart showing processing flow for the driving control device.

FIG. 10 shows flow of control to the driving control device 84 in the emergency stop control by the interface processing device 82 shown in the step S16 of FIG. 8. In a case where the emergency stop signal is input, the interface processing device 82 outputs the stop signal to the switch 98 (S30). Consequently, the switch 98 cuts the feed line 96, and stops the power supply to the driving control device 84 (S32). In a case where the power supply stops, the driving control device 84 cannot operate and shuts down (S34). As a result, the driving control device 84 does not transmit any control signal to the steering ECU 104, the power ECU 108, the brake ECU 112 or the lamp ECU 116, and the automatic driving control by the driving control device 84 ends.

Figure 11:
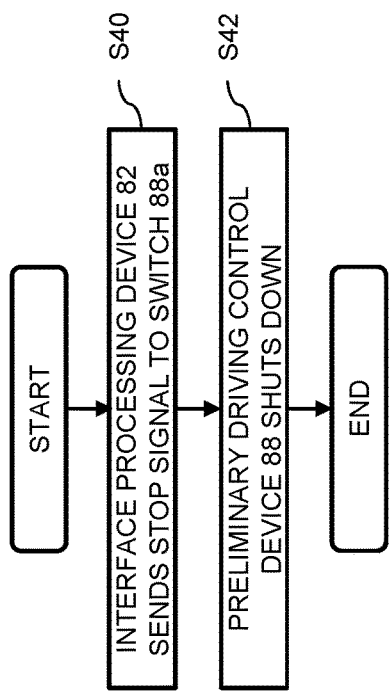
FIG. 11 is a flowchart showing processing flow for a preliminary driving control device.

FIG. 11 shows flow of control to the preliminary driving control device 88 in the emergency stop control by the interface processing device 82 shown in the step S16 of FIG. 8. In a case where the emergency stop signal is input, the interface processing device 82 outputs the stop signal to the switch 88a (S40). Consequently, the switch 88a shuts down the preliminary driving control device 88 (S42). For example, the device shuts down via the switch 88a by stopping the power supply to the preliminary driving control device 88.

The preliminary driving control device 88 does not perform any particular processing during the travel in the automatic driving mode by the driving control device 84. However, the preliminary driving control device 88 can functionally transmit the control signals to the steering ECU 104, the power ECU 108, the brake ECU 112 and the lamp ECU 116. Therefore, the shut-down of the preliminary driving control device 88 ensures that no control signals are transmitted to the steering ECU 104, the power ECU 108, the brake ECU 112 or the lamp ECU 116.

Note that it is also possible to have a mode to keep the preliminary driving control device 88 activated without shutting down the device. In this case, the preliminary driving control device 88 is set to be utilizable after the emergency stop is completed, or after predetermined inspection is further performed. This can make it possible to resume the operation of the stopped automatic driving vehicle 10 in the manual driving mode.

Figure 12:
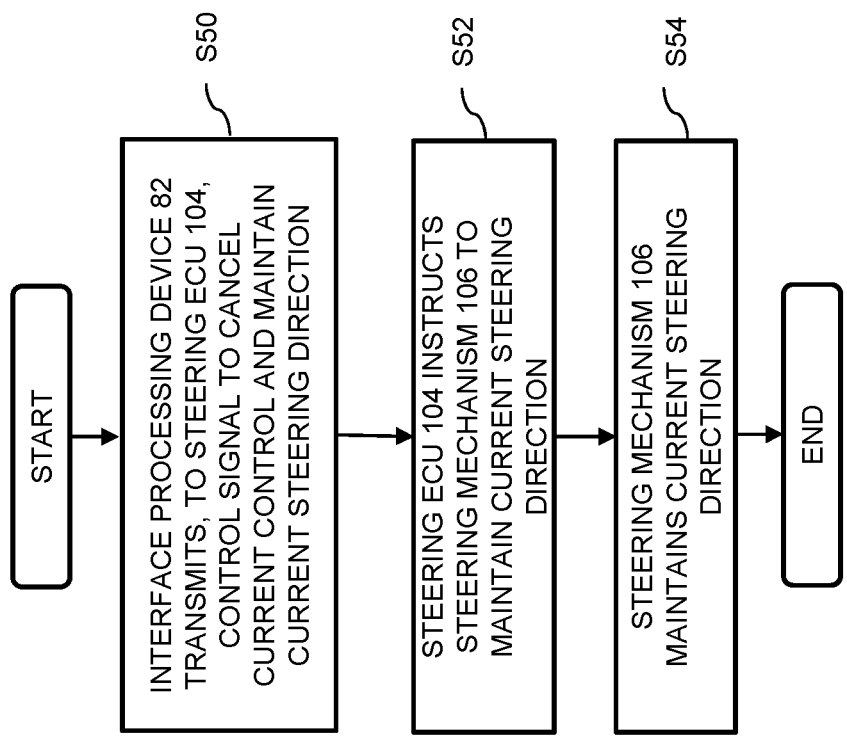
FIG. 12 is a flowchart showing processing flow for steering.

FIG. 12 shows flow of control concerning steering in the emergency stop control by the interface processing device 82 shown in the step S16 of FIG. 8. In a case where the emergency stop signal is input, the interface processing device 82 transmits, to the steering ECU 104, a control signal to cancel the control currently being received and maintain a current steering direction in the emergency stop operation (S50). Upon receiving the control signal, the steering ECU 104 immediately instructs the steering mechanism 106 to maintain the current steering direction (S52). Based on the instruction, the steering mechanism 106 operates to maintain the current steering direction (S54).

Note that the emergency stop operation concerning the steering may be set to another mode. Specific examples of the mode include a mode to set the steering angle to a straight proceeding direction, and a mode to select an optimal steering angle in accordance with the vehicle speed, the steering angle, a road surface condition, a surrounding situation or the like at that moment. For example, the optimal steering angle may be calculated in the driving control device 84 at any time before the emergency stop switch 34 is pressed, and transmitted to the interface processing device 82.

Figure 13:
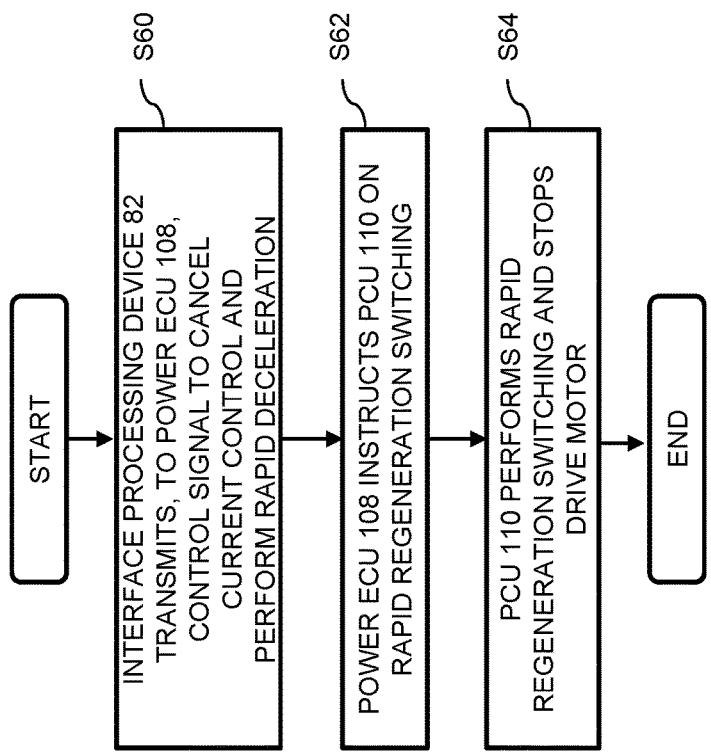
FIG. 13 is a flowchart showing processing flow for a drive motor.

FIG. 13 shows flow of control concerning the drive motor in the emergency stop control by the interface processing device 82 shown in the step S16 of FIG. 8. In a case where the emergency stop signal is input, the interface processing device 82 transmits, to the power ECU 108, a control signal to cancel the control currently being received and perform rapid deceleration that is the emergency stop operation (S60). Upon receiving the control signal, the power ECU 108 immediately instructs the power semiconductor of the PCU 110 to perform rapid regeneration switching (S62). Consequently, the PCU 110 performs an operation of performing the rapid regeneration switching and rapidly decelerating and stopping the drive motor (S64). Note that as the emergency stop operation, it is also possible to have a mode in which the deceleration is not performed by regenerating the drive motor and the drive motor is idled.

Figure 14:
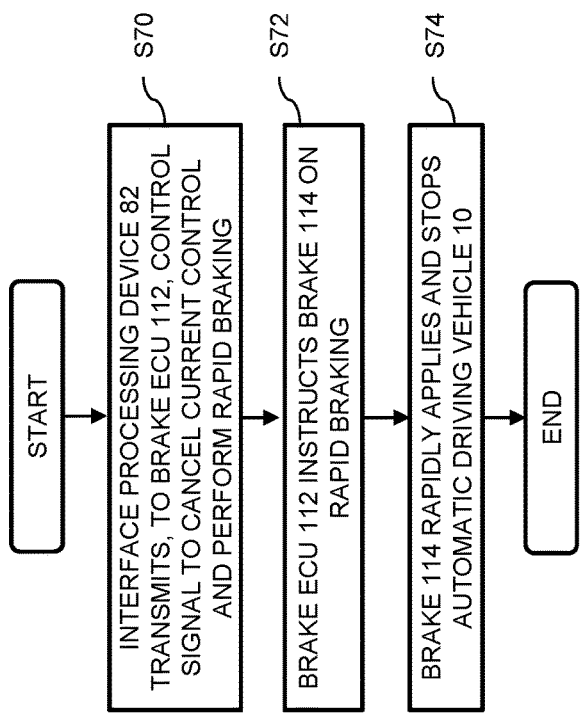
FIG. 14 is a flowchart showing processing flow for a brake.

FIG. 14 shows flow of brake control in the emergency stop control by the interface processing device 82 shown in the step S16 of FIG. 8. In a case where the emergency stop signal is input, the interface processing device 82 transmits, to the brake ECU 112, a control signal to cancel the control currently being received and perform rapid braking that is the emergency stop operation (S70). Upon receiving the control signal, the brake ECU 112 immediately applies the brake 114 (S72). Consequently, the brake 114 performs an operation of rapidly applying the brake and stopping the automatic driving vehicle 10 (S74). Note that deceleration in the rapid braking is performed to such an extent that passengers' safety can be ensured. For a load of the brake 114, an optimal value may be selected, for example, in accordance with the vehicle speed, steering angle, road surface situation or the like at the current time. For example, the optimal load may be calculated in the driving control device 84 at any time before the emergency stop switch 34 is pressed, and transmitted to the interface processing device 82.

Figure 15:
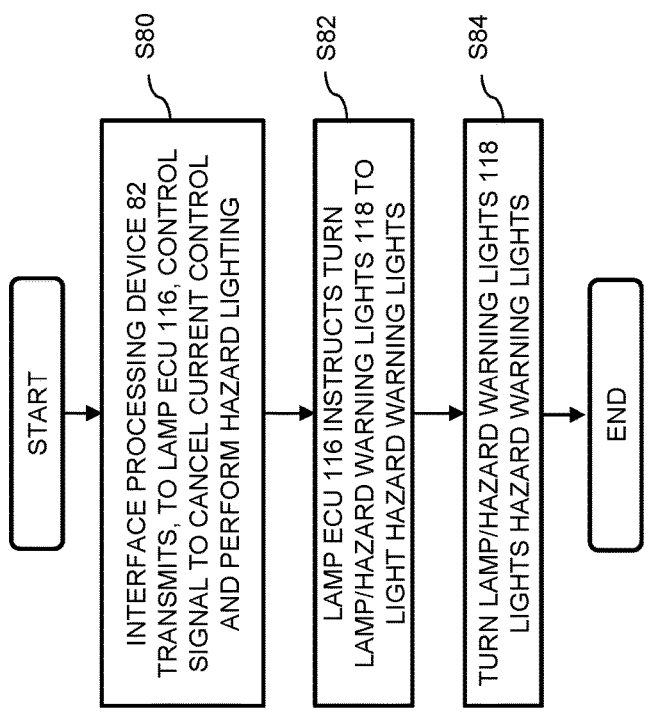
FIG. 15 is a flowchart showing processing flow for hazard lighting.

FIG. 15 shows flow of lighting control of hazard warning lights in the emergency stop control by the interface processing device 82 shown in the step S16 of FIG. 8. In a case where the emergency stop signal is input, the interface processing device 82 transmits, to the lamp ECU 116, a control signal to cancel the control currently being received and light the hazard warning lights (S80). Upon receiving the control signal, the lamp ECU 116 immediately instructs the turn lamp/hazard warning lights 118 to light the hazard warning lights (S82). Then, the turn lamp/hazard warning lights 118 light the hazard warning lights (S84).

It is assumed that the respective steps described with reference to FIG. 9 to FIG. 15 start substantially simultaneously in the interface processing device 82, although there may be slight differences depending on an order of the steps. However, if a slight temporal difference is generated depending on the order of the steps, the stop is considered as a top priority, and it is also considered that the output of the control signal to the brake ECU 112 is processed first. Alternatively, it is also considered that, to focus on attracting passengers' attention and then stopping the vehicle, the output of the voice from the speaker 80 shown in FIG. 9, and furthermore the display in the display 36, are processed first. Additionally, in consideration of time required in the signal transmission and time required in the processing, the order of the steps can be suitably changed, or time to wait for start of the processing can be provided.

Furthermore, in the above processing, the driving control device 84 and the preliminary driving control device 88 shut down, and hence at and after the start of the emergency stop processing, the driving control device 84 or the preliminary driving control device 88 does not send any control signals to the steering ECU 104, the power ECU 108, the brake ECU 112 or the lamp ECU 116. However, it is considered that depending on a hardware configuration of a control system or a software configuration, and due to the difference in the time required for the shut-down or the like, the steering ECU 104, the power ECU 108, the brake ECU 112 or the lamp ECU 116 may input the control signal from the interface processing device 82, and then input the control signal from the driving control device 84 or the preliminary driving control device 88. To solve this problem, in a case where the steering ECU 104, the power ECU 108, the brake ECU 112 and the lamp ECU 116 input the control signal from the interface processing device 82, the units may be set so that the units do not accept the next control signal or do not perform any processing based on the next control signal, for at least a certain amount of time after the input.

The automatic driving vehicle 10 performs the safety check after the emergency stop. Then, in a case where the safety is checked, or in a case where it is determined that the driving is possible, the driving is intended to restart. In this process, for example, the operator performs an operation of again turning on the activation switch provided in the vehicle. In this case, after the safety check is performed in accordance with program, the driving control device 84 and the preliminary driving control device 88 are activated again. This enables driving restart in a selected mode (the automatic driving mode or the manual driving mode). Furthermore, for example, if a defect is found in the driving control device 84 in a process of re-activation, only the preliminary driving control device 88 is activated again. In this case, only the driving in the manual driving mode can restart.

The above described emergency stop processing also exerts effects on a response to unauthorized access by a third party through the communication module 86 (hereinafter, the third party who performs the unauthorized access will be referred to as a cracker, and the cracker may also be called a hacker). In the automatic driving vehicle 10, high security measures are taken on control software including the communication module 86, and usually no cracker can make any unauthorized access. However, for example, it is considered that a cracker may find a security hole to access the driving control device 84, rewrite the program in the driving control device 84, input a fake signal to the driving control device 84, and output the fake signal from the driving control device 84.

If a defect is generated, for example, in the driving operation of the automatic driving vehicle 10 due to unauthorized access by a cracker, the operator presses the emergency stop switch 34. At this time, in the automatic driving vehicle 10, the interface processing device 82 immediately shuts down the driving control device 84, and hence worsening of the defect caused by the driving control device 84 can be prevented. Additionally, the shut-down of the preliminary driving control device 88 can prevent the defect caused by the preliminary driving control device 88 from becoming worse.

The cracker may attempt to make unauthorized access from the driving control device 84 to the interface processing device 82, the steering ECU 104, the power ECU 108, the brake ECU 112 or the lamp ECU 116 through the CAN 100 or the like. However, the interface processing device 82, the steering ECU 104, the power ECU 108, the brake ECU 112 or the lamp ECU 116 is hardware separate from the driving control device 84, and hence the unauthorized access is more difficult to make. Consequently, the present embodiment is effective in shutting down the driving control device 84 that may constitute an access start point.

The invention claimed is:

1. An automatic driving vehicle comprising:
   a driving control processor that receives power supply from a battery to operate, and that controls automatic driving of at least a vehicle speed and a steering angle, and the driving control processor is configured to output a driving control signal;
   a driving mechanism processor that receives the driving control signal from the driving control processor and instructs a driving mechanism to perform a driving operation, including steering of the vehicle, based on the driving control signal;
   a communication processor that wirelessly communicates with an external device outside of the vehicle, the communication processor being configured to output a communication control signal to the driving control processor, the driving control signal sent by the driving control processor being based on the communication control signal received by the driving control processor;
   a preliminary driving control processor that receives the power supply from the battery to operate, the preliminary driving control processor being configured to receive an operation signal for manual driving control of the vehicle when the driving control processor does not operate;
   an emergency stop switch configured to be operated by an operator; and
   an emergency stop control processor configured to, when the emergency stop switch is operated, shut off the power supply to the driving control processor to shut down the driving control processor, and the emergency stop control processor is configured to output an emergency control signal that causes the driving mechanism processor to execute an emergency stop operation in which the emergency control signal causes the driving mechanism processor to control the steering of the vehicle, wherein:
   the emergency stop control processor is configured to only perform local communication within the vehicle, and
   in response to the emergency stop switch being operated, the emergency stop control processor is further configured to send a control signal to cancel a current control of a lamp control processor and to instruct the lamp control processor to light hazard warning lights.

2. The automatic driving vehicle according to claim 1, wherein in a case where the emergency stop switch is operated, the emergency stop control processor remains activated.

3. The automatic driving vehicle according to claim 2, wherein at least one peripheral in-vehicle device includes a touch panel that accepts an operation from the operator to control the at least one peripheral in-vehicle device.

4. The automatic driving vehicle according to claim 1, further comprising:
   a manual driving control lever that accepts a manual input of an operation of manual driving by the operator and outputs an operation signal to the preliminary driving control processor, wherein the emergency stop control processor also shuts off the power supply to the preliminary driving control processor when the emergency stop switch is operated.

5. The automatic driving vehicle according to claim 1, wherein:
the driving mechanism processor is a steering mechanism processor that is configured to control a steering mechanism to control the steering of the vehicle, and
when the emergency stop switch is activated, the emergency stop control processor outputs the emergency control signal to the steering mechanism processor to maintain a current steering direction.

* * * * *